Jan. 9, 1951   E. B. MANSFIELD ET AL   2,537,632
TIRE
Filed Dec. 10, 1945   7 Sheets-Sheet 1

INVENTORS
ERNEST B. MANSFIELD
RAYMOND J. LUEBBERS
AND
ROBERT E. LANGE
BY Ely & Frye
ATTORNEYS Jan. 9, 1951 E. B. MANSFIELD ET AL 2,537,632
TIRE
Filed Dec. 10, 1945 7 Sheets-Sheet 2
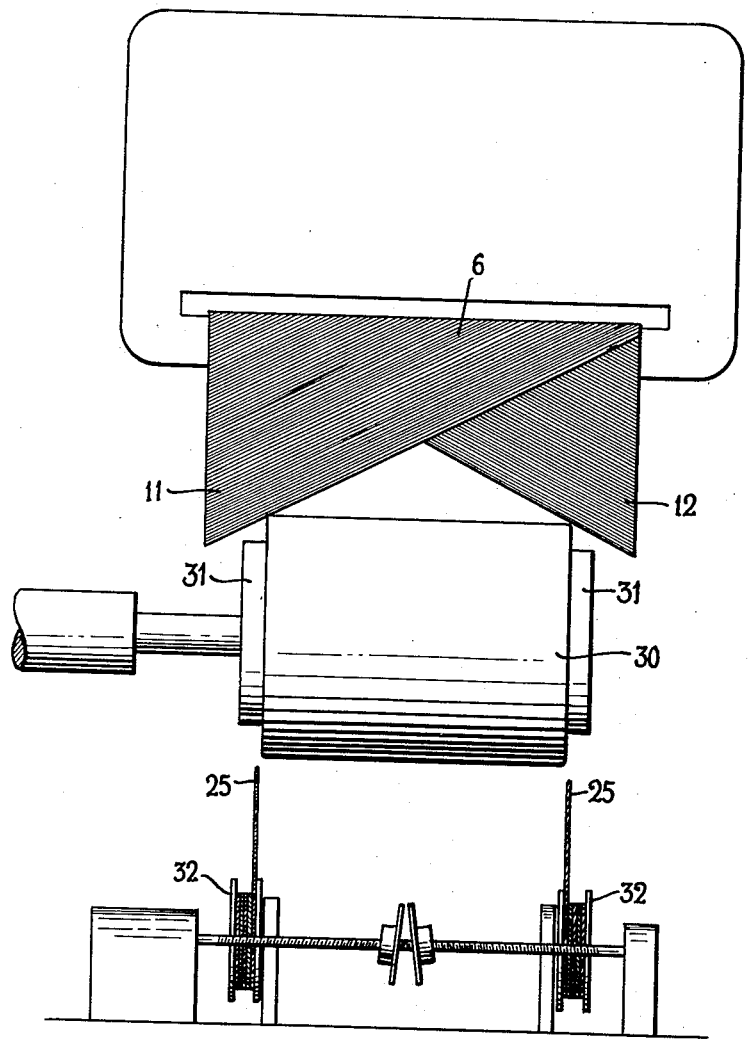
INVENTORS
ERNEST B. MANSFIELD
RAYMOND J. LUEBBERS
AND
ROBERT E. LANGE
BY
ATTORNEYS Jan. 9, 1951 E. B. MANSFIELD ET AL 2,537,632
TIRE
Filed Dec. 10, 1945 7 Sheets-Sheet 3
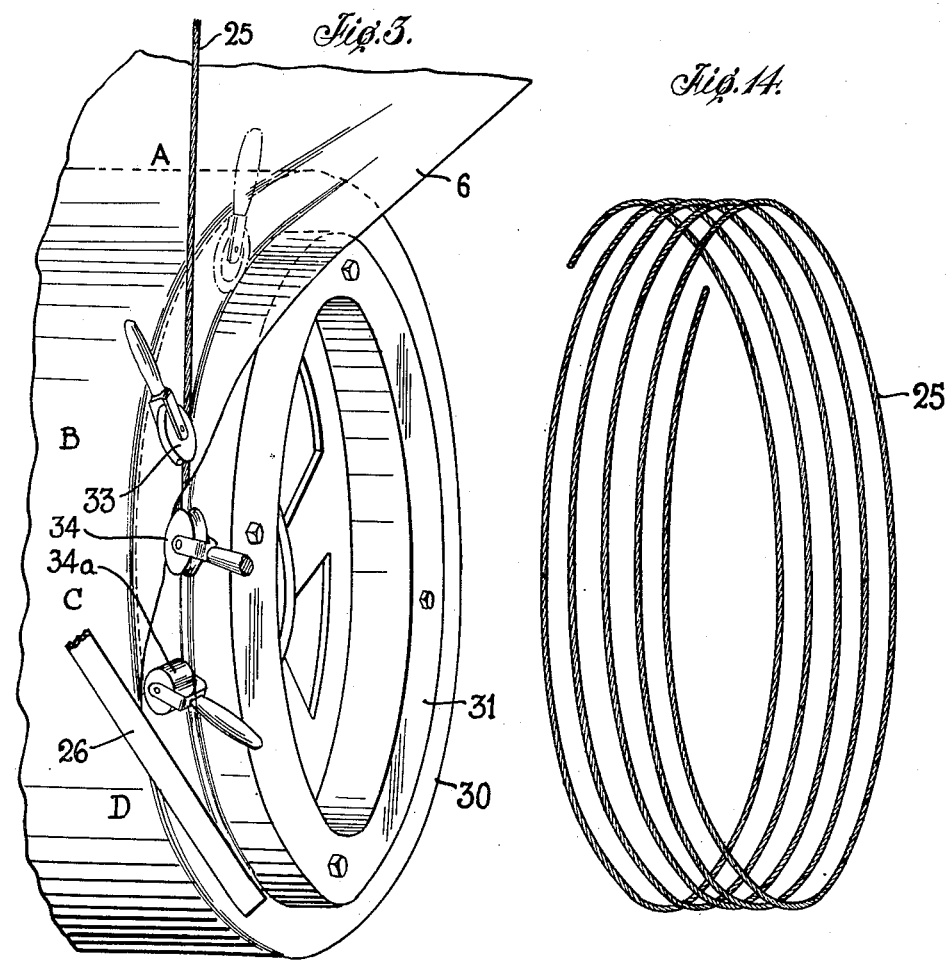
INVENTORS
ERNEST B. MANSFIELD
RAYMOND J. LUEBBERS
AND
ROBERT E. LANGE
BY
ATTORNEYS Jan. 9, 1951  E. B. MANSFIELD ET AL  2,537,632
TIRE
Filed Dec. 10, 1945  7 Sheets-Sheet 4
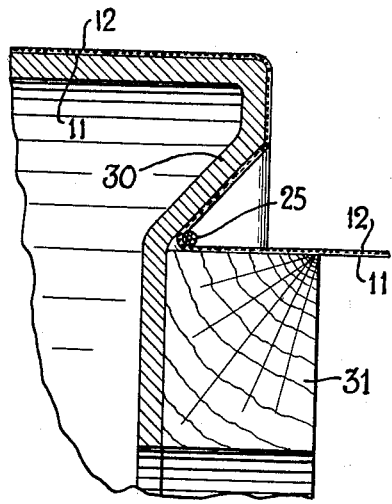
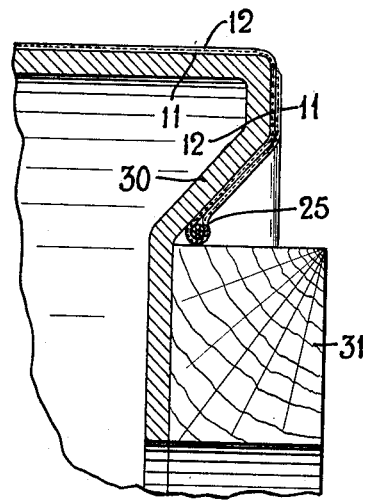
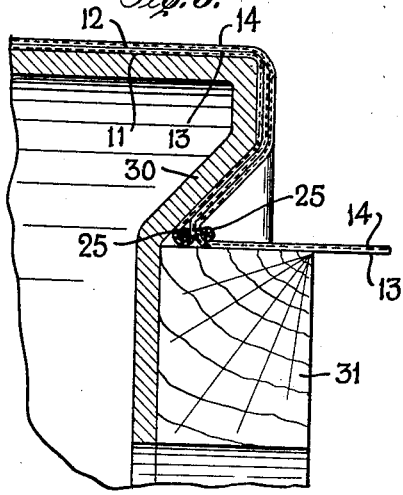
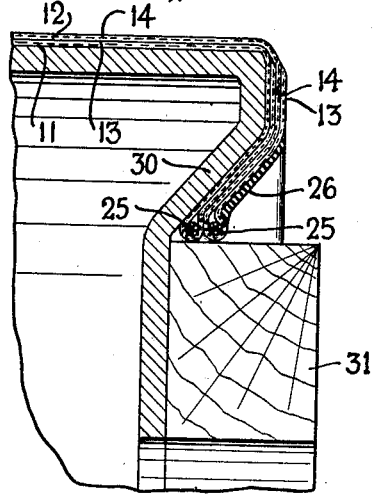
INVENTORS
ERNEST B. MANSFIELD
RAYMOND J. LUEBBERS
AND
ROBERT E. LANGE
BY
Ely & Frye
ATTORNEYS

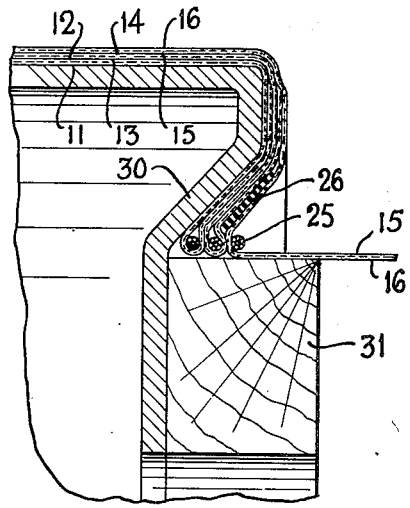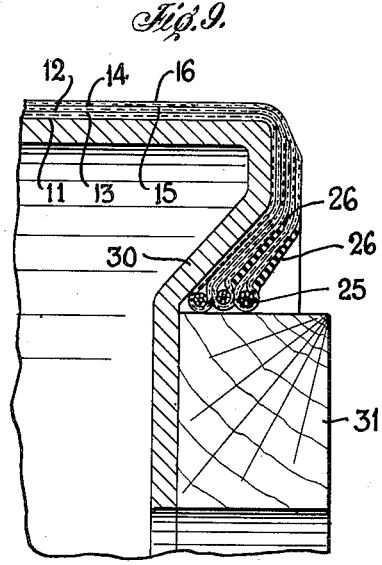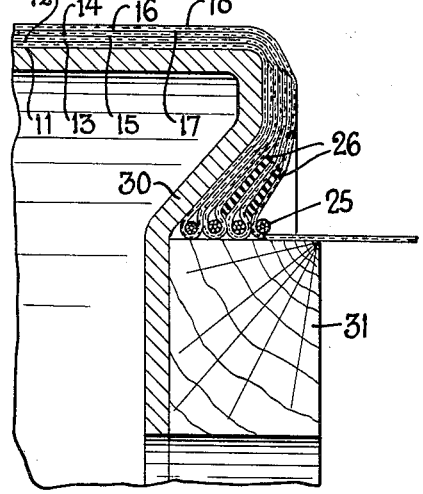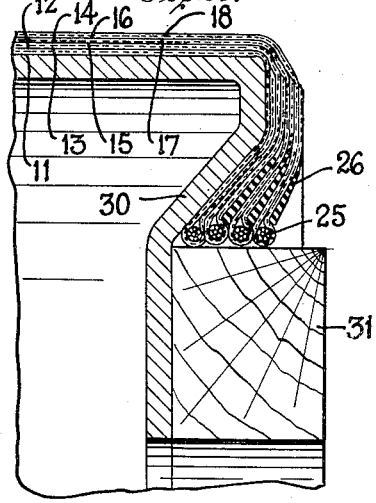

Jan. 9, 1951     E. B. MANSFIELD ET AL     2,537,632
TIRE
Filed Dec. 10, 1945     7 Sheets-Sheet 6
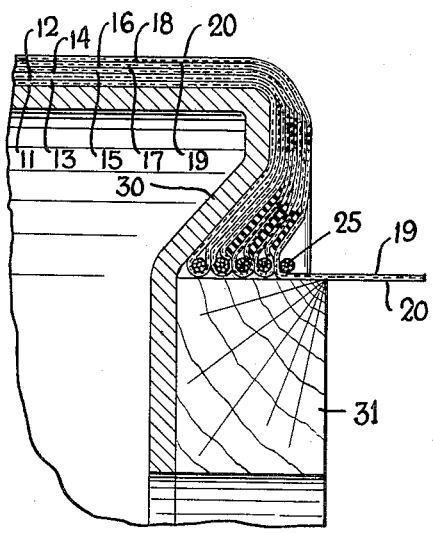
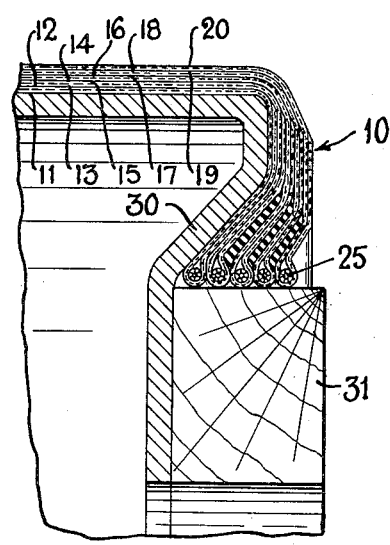
INVENTORS
ERNEST B. MANSFIELD
RAYMOND J. LUEBBERS
AND
ROBERT E. LANGE
BY Ely & Frye
ATTORNEYS Jan. 9, 1951 E. B. MANSFIELD ET AL 2,537,632
TIRE
Filed Dec. 10, 1945 7 Sheets-Sheet 7
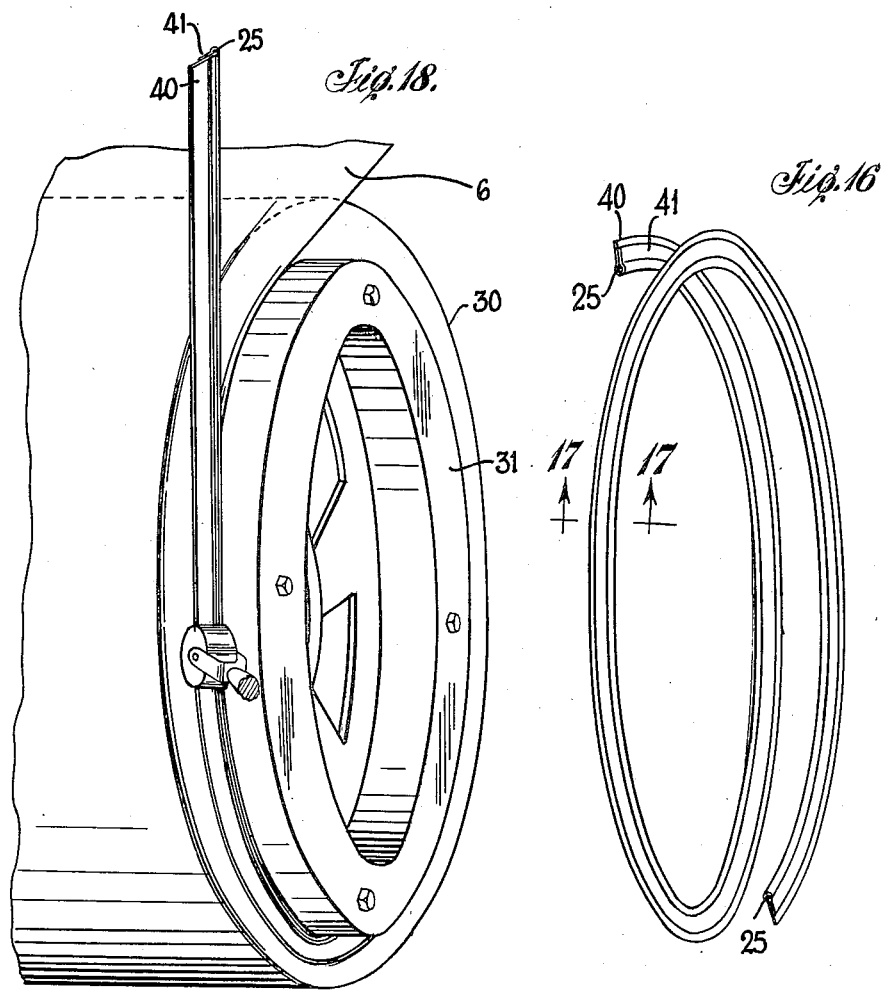
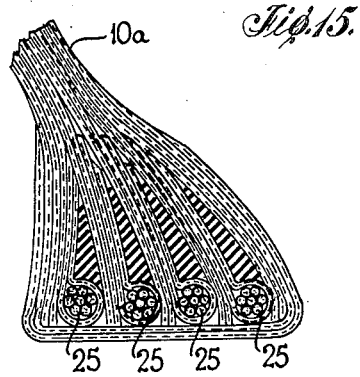
INVENTORS
ERNEST B. MANSFIELD
RAYMOND J. LUEBBERS
AND
ROBERT E. LANGE
BY
ATTORNEYS

Patented Jan. 9, 1951

2,537,632

UNITED STATES PATENT OFFICE 2,537,632

TIRE

Ernest B. Mansfield, Raymond J. Luebbers, and Robert E. Lange, Akron, Ohio, assignors to The Firestone Tire & Rubber Company, Akron, Ohio, a corporation of Ohio Application December 10, 1945, Serial No. 633,996

1 Claim. (Cl. 152—354)

This invention relates to pneumatic cord tires and more particularly to the construction of large tires at their bead portions. The invention provides a more efficient tire building method and an improved tire construction.

The prior practice of building drum built tires included the laying of each couplet ply of cord fabric of the tire separately on the tire building drum or core, the ply usually being in the form of an endless band. After each band was applied its edges were stitched radially inwardly against the sides or edges of the drum or core or against an under lying tire ply, if a previous ply had been applied. After a number of plies have been laid and stitched into position on the building drum or core an endless inextensible hoop-like tire bead was positioned against the tire plies and additional plies are laid on in similar manner as were previous plies. As an illustration, a ten ply tire of the prior art commonly was built with four plies under and six plies over the head with the edges of eight of the plies being turned up or down, as the case might be, as will be understood by those familiar with the art. These turn-ups, and turn-downs, were necessary in order to obtain proper anchorage of the plies to the inextensible bead so that the cords in each ply would exert their proportional share of restraint against the internal air pressure of the inflated tire. The plies not turned up or down about the bead but extended to the heel or toe of the bead were anchored to the bead through the medium of the adhesion of the cord fabric plies one to the other. The cross section circumference of a cord tire is stretched, in molding, up to six percent or more. The molding is done before the tire is vulcanized and while the rubber compound of the tire is softened by heat; accordingly if the edges of a ply are not securely anchored during the tire molding, they will pull away from the bead. If all of the individual cords of the plies are built into a tire with equal tension and on the same cord angle, and are anchored against pulling away from the inextensible beads of the tire they will be subjected to approximately equal strains when the tire is inflated and in service. The cords in plies not anchored at the inextensible bead, but which are pulled away from the bead during molding of the tire, have more residual stretch left in the cords than do the cords of plies which do not pull away. In an inflated tire the cords having the least residual stretch carry the load on the tire until they weaken and break, thus placing added strain on the remaining cords having more residual stretch. For these, and other reasons well known to the art, it is desirable to have the cords of the plies of a tire placed in a tire before molding, all having the same cord direction in reference to the surface of the building drum or core, and with each cord having the same amount of stretch and being firmly anchored to an inextensible bead.

A fault of tire constructions prior to the present invention was that in order to anchor the cords of the plies to an inextensible, high carbon steel wire single bead or twin beads, it was necessary to turn the edges of the plies up or down, as the case might be, about the bead or beads. Accordingly a twin bead, ten ply tire would have from four to six plies turned under between the inextensible hoop-like twin beads of the tire and the inside diameter of the tire beads. In a ten ply, single bead tire, all ten plies would be turned under between the bead and the inside diameter of the tire. Such tires necessarily have the inextensible beads positioned so high in the sides of the tire relative to the tire bead contact with a tire rim on which the tire is mounted in service, that the inextensible bead or anchor members permit the bead portion of the tire to rock on the rim, which rocking causes tire failures, pinching and cutting of the tire inner tubes and endangers the bears of the tires being blown over the rim flanges.

An object of the present invention is to provide a tire having a single continuous strip of cord ply fabric circumferentially wound in as many convolutions in the tire body as the tire is designed to have plies, each convolution lying wholly exterior to the preceding radially inner convolutions.

Another object of the invention is to provide a tire so constructed that each individual cord is anchored to an inextensible bead.

A further object of the invention is to provide a tire having its inextensible bead members extending radially inwardly of the sides of a tire further than has been the case in tires heretofore.

Yet another object of the invention is to provide an inextensible bead for a pneumatic tire which bead is in the form of a continuous spiral without joints, laps or splices therein.

Still another object of the invention is to provide a continuous inextensible bead in the form of a helix or cylindrical spiral.

Yet a further object is to provide a tire having a single bead construction comprising an inextensible member or cable in the form of a helix or cylindrical spiral, the radius of the cylinder defined by said spiral being not more than one cord ply couplet thickness greater than the inside radius of the bead portion of the tire, plus the thickness of other tire material such as chafing strips, bead flippers, etc., which may be interposed between the inextensible bead and the inside diameter of the bead portion of the tire.

Other objects and advantages of the present invention will be apparent to those familiar with the art from the following description in connection with the accompanying drawings wherein:

Fig. 2 is a view indicating the relative position of a building drum and building material, shown somewhat diagrammatically;

Fig. 3 is a diagrammatic view illustrating the process of assembling the ply stock, gum strips, and inextensible bead members of the tire, shown in Fig. 1 on a tire building drum;

Figure 1:
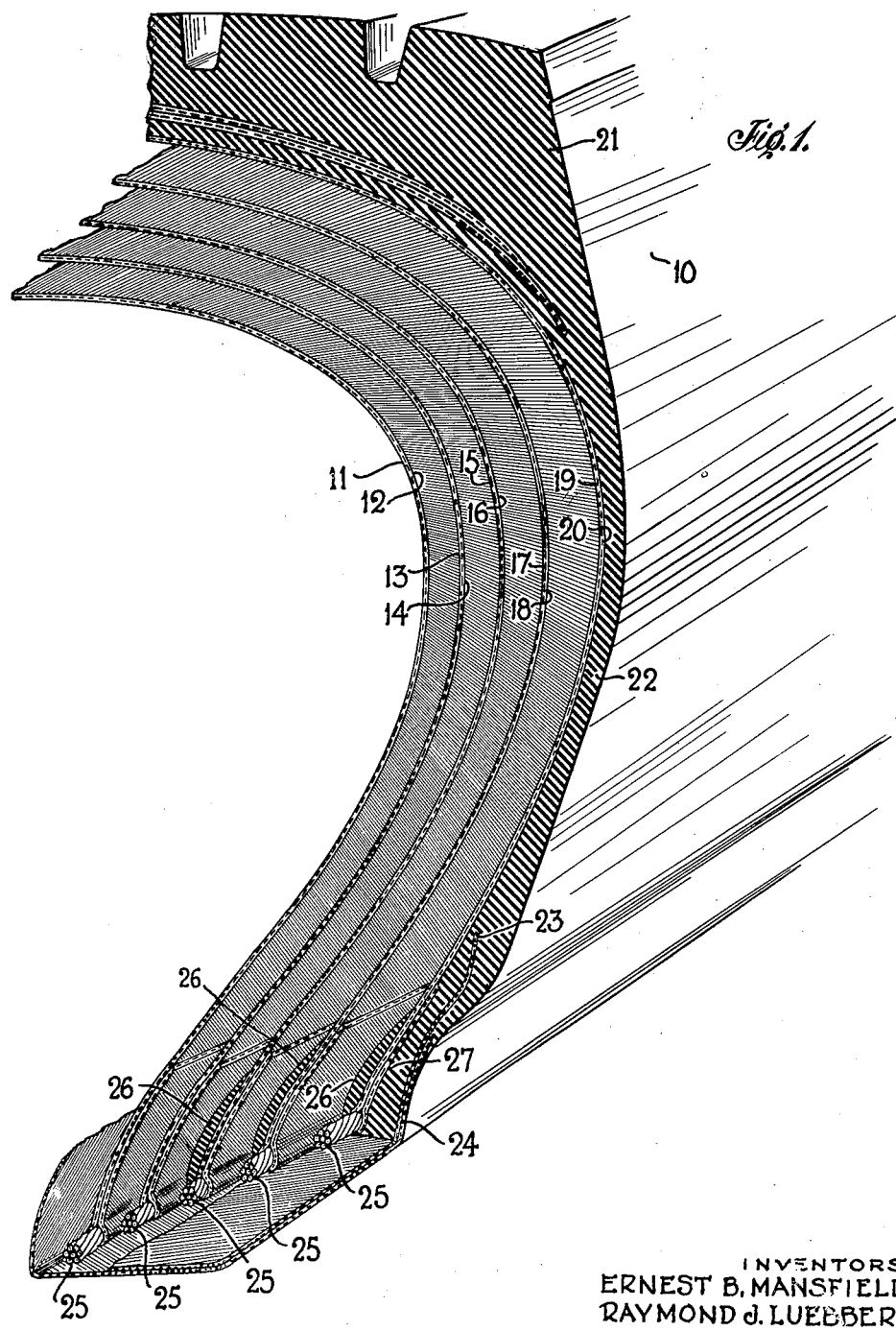
Fig. 1 is a perspective view of stepped-down fragmentary section of a tire embodying the present invention.

Figs. 4 to 13 inclusive illustrate in sequence the successive stages of the construction of the tire illustrated in Fig. 1;

Fig. 14 illustrates on a reduced scale the inextensible bead member of the tire shown in Fig. 1 with the tire removed;

Fig. 15 is a sectional view of a bead of a tire having a modified construction;

Fig. 16 is a perspective fragmentary sectional view of a bead or anchor member of the tire shown in Fig. 15 with flippers or tire reinforcement attached thereto;

Fig. 17 is a sectional view taken on line 17—17 of Fig. 16; and Fig. 18 is a similar view to Fig. 3 but illustrating the assembling of the material of the modified form of the invention shown in Fig. 15.

Referring now more particularly to the drawings it will be seen, by reference to Fig. 1, that a tire indicated generally as 10 is composed of a fabric carcass of five laminations of a couplet or two ply strip of cord tire fabric, the cords of the plies of each couplet crossing at a substantial angle, formed by convolutions 11, 12, 13, 14, 15, 16, 17, 18, 19 and 20 which generally correspond in appearance and function to the plies of common tires. The tire 10 also has the usual tread portion 21, sidewall 22, chafing strips 23 and 24, and inextensible bead portions 25, the latter being in the form of cylindrically spiralled or helical wire cables. The tire 10 also includes gum strips 26 and 27.

The tire is fabricated on a power driven, rotatable, shoulder type building drum 30, provided with removable side rings 31. The side rings are concentric with the drum and they function as a building surface on which the bead portions of the tire are fabricated.

At successive stations about the drum the different components of the tire are applied to the drum. Thus a strip 6 of tire cord stock of predetermined width and length relative to the circumferential length of the building drum 30 is led from a stock roll, or other source, not shown, onto the drum 30 at station A. To start the strip 6 onto the drum, a coat of rubber cement is applied to the shoulders of the drum. The leading end of strip 6 is manually drawn forward and attached to the drum by centering the strip on the drum and turning the edges of the strip down against the cemented shoulders whereby the strip 6 adheres to the drum. The drum is then rotated, winding the strip 6 circumferentially about the drum in a predetermined number of convolutions or layers, in the present illustration, consisting of five convolutions about the drum. However, as will readily be understood by those familiar with the art, the strip 6 may be of a length much greater than that required for the finished length, the proper length being torn off when the strip has been wound around the drum the desired number of times.

The strip 6 is drawn on the drum under some tension which causes the edges of the strip to turn radially inwardly over the shoulders of the drum and to lie against the outer surfaces of the rings 31. However, stitcher or other means, may be employed, if found desirable, to press the strip 6 laterally inwardly against the junction of the drum 30 and the side rings 31, or against the junction of the side rings 31 and the edges of the tire being fabricated. The substantially inextensible bead cables which are to be built into edges of the strip 6 to form the tire beads are wound on rotatable stock spools 32, these spools being carried on suitable shafts and shaft supports, and being supplied with suitable tension devices, not shown. One of the spools is aligned with each side of the drum 30 so that cables 25 may be led onto the drum 30 in similar manner and for the same number of convolutions as the strip 6. A cable 25 is laid over and against each of the opposite edge portions of the strip 6 throughout the full length of the five convolutions of the strip about the building drum. By reference to Fig. 3 it will be seen that the cable 25 contacts the strip 6 a short distance from the edges of the strip, thus leaving a width of strip to be looped back over the cable as will be explained later herein. The leading ends of the cables 25 are started or fed against the strip 6 at a station B as will be seen by reference to Fig. 3. It is important that each cable be placed accurately and for this purpose guides or placement means, such as rollers 33 may be used to force the cables firmly toward the rings 31, and at the same time toward the shoulders of the drum 30, the cables in turn forcing the edge portions of the strip 6 with it; thus each succeeding turn or layer of the strip 6 has its edges drawn firmly against the next preceding layer. Immediately following the application of the cables at station B as illustrated in Fig. 3 (only one side of the drum 30 being shown) those portions of the edges of the strip 6 which lie laterally outwardly of the cables 25 are progressively turned radially outwardly about the cables by suitable means, such as a guide roller 34 and 34a, to effect a "turn-up" as will be understood by those familiar with the art.

Tire designers often build strips of rubber or strips of rubberized fabric into the sides of a tire, and indeed, in any portion of the tire the designer wishes to add additional rubber, or fabric strength for any reason. The placing of additional strips of rubber 26 in the tire construction as fillers is illustrated at station D of Fig. 3. By reference to Fig. 3 it will be seen that the strips 26 are continuously fed from any suitable source of supply as from a stock roll, not shown, onto that portion of the strip 6 which has been turned over the shoulders of the drum 30. By reference to Fig. 1 it will be seen that the rubber strips 26 are not started until the beginning of the second lamination of the strip 6. It will also be seen that additional gum strips 27, only one being shown, have been laid over the "turn-up" portion of the last layer of the strip 6. These strips 27 are built into the tire in continuous fashion as are the strips 26. It is to be understood that strips 26, if desired, may be laid on strip 6 before it reaches the drum 30, as may other material if found desirable. While the strips 26 have been shown over-lying the "turn-up" portions of the edges of the strip 6, it is to be understood that the invention is not to be limited to the paricular position in which the gum strips are shown, as obviously they may be placed adjacent the cables 25 or otherwise if desired.

After the above identified portions of the tire 10 have been assembled the rotation of the drum 30 is stopped and the tread 21 including the sidewalls 22, and the chafers 23 and 24 are applied in the manner known in the art, the side rings 31 being removed before the chafing strips are turned around the edges of the tire, as will be understood by those familiar with tire building. It will also be understood that after assembly of its components the tire is removed from the drum and molded and vulcanized in a tire mold in the usual manner which gives the tire the finished appearance illustrated in Fig. 1.

The continuous inextensible bead construction embodying the present invention facilitates the building of tires of various structures. A tire 10a with a construction at its bead as shown in Fig. 15 may be built by first attaching a bead flipper 40 and a rubber strip 41 to the cable 25 as shown in Fig. 17, after which the tire building operation illustrated in Fig. 18 is similar to that described above in reference to the fabrication of tire 10, it being pointed out that there are only four convolutions of the bead cable 25 in the tire construction shown in Fig. 15. In the construction of a tire with beads as shown in Fig. 15, it is to be noted that the strip 6 is of proper width to extend over the drum 30 just to the side ring 31. All of the laminations or layers of tire 10a end "blind" and rely on their anchorage to the inextensible cable 25 through the medium of adhesion to the flipper 40 which is looped about the cable. This tire construction is novel and has the advantage of saving material, while placing the inextensible member 25 radially inwardly in the bead portion of the tire so that the tire anchorage is very close to the tire bead seat on its rim.

It will now be seen that applicants have provided a cord tire structure in which each separate cord is permanently anchored to a relatively inextensible bead whereby the said cords are prevented from "pulling-up" during tire molding, and each cord is given the same tire molding stretch as the other cords in the tire. It will also be seen that applicants have a minimum amount of stock at the bead portions of the tire, that the bead cables are placed radially inwardly very close to the inside of the tire bead portions, and that applicants' method of fabricating the tire is a more nearly continuous and a more economical process than the methods of the prior art.

Modifications may be resorted to without departing from the spirit of the invention which is to be limited, therefore, only by the prior art and the scope of the appended claim.

What is claimed is:

A pneumatic cord tire casing having a body portion composed of a single continuous two layer strip of cord fabric wound circumferentially on itself forming at least two convolutions of said strip, the cords of the adjacent layers crossing each other and each cord of said strip being a separate cord from any other cord of the strip.

ERNEST B. MANSFIELD.
RAYMOND J. LUEBBERS.
ROBERT E. LANGE.

REFERENCES CITED

The following references are of record in the file of this patent:

UNITED STATES PATENTS

| Number | Name | Date |
| --- | --- | --- |
| 1,211,035 | Archer | Jan. 2, 1917 |
| 1,294,427 | Dickinson | Feb. 18, 1919 |
| 1,401,148 | Fording | Dec. 27, 1921 |
| 1,496,164 | Morris | June 3, 1924 |
| 1,871,438 | Abbott | Aug. 16, 1932 |
| 1,875,643 | Musselman | Sept. 6, 1932 |

Certificate of Correction

January 9, 1951

Patent No. 2,537,632

ERNEST B. MANSFIELD ET AL.

It is hereby certified that error appears in the printed specification of the above numbered patent requiring correction as follows:

Column 1, line 21, for "head" read *bead*; column 2, line 28, for "bears" read *beads*; column 5, line 6, for "paricular" read *particular*; column 6, list of references cited, under "UNITED STATES PATENTS" add the following:

| | | |
|---|---|---|
| 1,259,289 | Renner | Mar. 12, 1918 |
| 1,356,132 | Doughty | Oct. 19, 1920 |
| 1,403,091 | Midgley | Jan. 10, 1922 |
| 1,611,998 | Comstock | Dec. 28, 1926 |
| 1,732,793 | Darrow | Oct. 22, 1929 |
| 1,813,176 | Leguillon | July 7, 1931 |
| 2,143,694 | Hauvette | Jan. 10, 1939 | under "FOREIGN PATENTS" insert—

| Number | Country | Date |
|---|---|---|
| 197,704 | Great Britain | of 1923 | and that the said Letters Patent should be read as corrected above, so that the same may conform to the record of the case in the Patent Office.

Signed and sealed this 11th day of September, A. D. 1951.

[SEAL]

THOMAS F. MURPHY,
*Assistant Commissioner of Patents.*